Patented July 11, 1950

2,514,387

UNITED STATES PATENT OFFICE 2,514,387

PREPARATION OF 1,1-DICYANO ETHYLENE BY THE PYROLYSIS OF 1,1,3,3-TETRACYANO PROPANE

Harry Gilbert, Cuyahoga Falls, Ohio, assignor to The B. F. Goodrich Company, New York, N. Y., a corporation of New York No Drawing. Application March 4, 1949, Serial No. 79,712

11 Claims. (Cl. 260—465.8)

This invention relates to a method for the preparation of 1,1-dicyano ethylene, which method involves the thermal decomposition of 1,1,3,3-tetracyano propane.

In copending applications of Alan E. Ardis, Serial Nos. 785,520, filed November 7, 1947 now Patent Number 2,476,270, and 63,434, filed December 3, 1948 now Patent Number 2,502,412, two novel methods for the preparation of 1,1-dicyano ethylene are disclosed. The first method involves the pyrolysis of 1-acetoxy-1,1-dicyano ethane to give 1,1-dicyano ethylene and acetic acid, and the second method involves the pyrolysis of compounds of the general formula

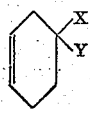

wherein X and Y are selected from the class consisting of —CN and —CONH₂ groups to give 1,1-dicyano ethylene and butadiene.

I have now discovered that 1,1-dicyano ethylene may also be readily prepared in excellent yields by the thermal decomposition of 1,1,3,3-tetracyano propane. In addition to 1,1-dicyano ethylene, some malononitrile is also formed, the pyrolysis reaction proceeding substantially as follows:

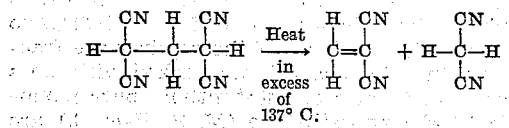

This reaction provides a valuable and economical method for the preparation of 1,1-dicyano ethylene since the starting material, 1,1,3,3-tetracyano propane, is easily prepared by the reaction of malononitrile and formaldehyde in aqueous solution.

The precise conditions under which the thermal decomposition reaction is carried out are not strictly critical provided, of course, that the heating of the 1,1,3,3-tetracyano propane be sufficient to cause the evolution of vapors. The tetracyano propane is itself thermally unstable and does not exist in the gaseous form. Vapors containing the desired 1,1-dicyano ethylene are evolved when 1,1,3,3-tetracyano propane is heated under atmospheric pressure to a temperature just above its melting point, that is, just above 137° C., and accordingly these conditions are operative. However, the reaction proceeds very slowly at atmospheric pressures when temperatures below about 150° C. are utilized and it is therefore desirable that reduced pressures or higher temperatures, preferably both, be employed, whereupon the thermal decomposition of the 1,1,3,3-tetracyano propane proceeds quite rapidly. In this connection it has been found that pressures of approximately 2 to 50 mm. of mercury are preferably used while temperatures of from 150° C. to 250° C. are especially preferred.

The thermal decomposition reaction may be carried out in any one of a number of different manners. For example, one preferred method consists simply in heating the 1,1,3,3-tetracyano propane, a white solid, in a distillation apparatus whereupon vapors of 1,1-dicyano ethylene are formed, and collecting and condensing the resulting vapors in a suitable receiver, preferably provided with external cooling means. Alternatively, however, the reaction may be carried out by passing the 1,1,3,3-tetracyano propane through a heated metal or glass pyrolysis tube and condensing the effluent vapors or by other methods of thermal decomposition. When the thermal decomposition is accomplished in the above manner the product which collects in the receiver is a mixture of 1,1-dicyano ethylene, malononitrile, and in some instances, small quantities of 1,1,3,3-tetracyano propane. The 1,1-dicyano ethylene is then separated from the mixture by utilizing any of several methods of separation. For example, one method of separating the 1,1-dicyano ethylene consists in utilizing the tendency of monomeric 1,1-dicyano ethylene to polymerize on standing or on heating, and allowing it to polymerize, or even adding water to hasten the polymerization. An alcohol such as ethyl, propyl or butyl alcohol, or the like, is then added to the mixture to dissolve the malononitrile and any 1,1,3,3-tetracyano propane which might be present and the insoluble polymer is removed by filtering. The polymerized 1,1-dicyano ethylene can then be depolymerized by pyrolysis, preferably at temperatures of 170° C. to 250° C., to obtain very pure monomeric 1,1-dicyano ethylene, a process disclosed in a copending application, Serial No. 79,713, filed Mar. 4, 1949.

A second and the preferred method consists simply in fractionating the mixture from the receiver in an efficient column, and preferably at reduced pressures. 1,1-dicyano ethylene distills at 47° C. at 2 mm. and malononitrile at 90° C. at 2 mm.

A third useful method of separation involves treating the reaction mixture with a conjugated diolefin such as butadiene or cyclopentadiene which reacts with the 1,1-dicyano ethylene to form a solid substituted cyclohexane which can be separated from the malononitrile and impurities and pyrolyzed again at temperatures in excess of 400° C. to give monomeric 1,1-dicyano ethylene and the conjugated diolefin.

When using either of the latter two methods, it is desirable that the 1,1-dicyano ethylene be stabilized against polymerization from the time that it is formed. This may be accomplished by using a suitable 1,1-dicyano ethylene stabilizer (that is, a polymerization inhibitor) which may be mixed with the 1,1,3,3-tetracyano propane prior to pyrolysis or placed in the receiver for the pyrolysis product. Such a stabilizer is also preferably present in the receiver used to collect the 1,1-dicyano ethylene when it is separated by distillation and when it is desired to obtain the monomer by pyrolysis of the polymer or the conjugated diolefin product. Suitable stabilizers include phosphorus pentoxide and phosphorus pentasulfide, which are preferred, as well as certain phenolic materials such as picric acid, trinitrobenzene and pyrogallol, or the stabilization may be accomplished simply by passing a current of sulfur dioxide through the pyrolysis system, the oxides of sulfur in general being excellent stabilizers for the monomer. The stabilizer may be present in any desired amount but in general as little as 0.5 to 3% based on the amount of monomer is sufficient to prevent polymerization for extended periods of time.

In addition to the methods disclosed hereinabove, still another useful method for collecting and separating the 1,1-dicyano ethylene exists. This method comprises directing the pyrolysis vapors into a receiver containing a liquid hydrocarbon such as toluene, isopropyl toluene (p-cymene) and the like. 1,1-dicyano ethylene and malononitrile are soluble in such hydrocarbons while any 1,1,3,3-tetracyano propane present is insoluble and can be removed simply by filtering. Upon fractionation of the filtrate, monomeric 1,1-dicyano ethylene is obtained in a very pure form. Alternatively, the 1,1-dicyano ethylene can be recovered from the liquid mixture by cooling to a temperature below about —20° C. whereupon the monomer crystallizes and can be removed by filtering.

The following specific examples are intended to illustrate the preparation of 1,1-dicyano ethylene by the method of this invention, but are not intended to be construed as limiting the scope thereof, for there are, of course, numerous possible variations and modifications. In the examples all parts are by weight.

Example I 190 parts (1.32 moles) of 1,1,3,3-tetracyano propane are placed in a distilling flask which is connected to a receiver. The receiver is cooled to —5° C. and is lined with phosphorus pentoxide to inhibit the polymerization of the 1,1-dicyano ethylene. The 1,1,3,3-tetracyano propane is then heated to a temperature of 180° C. and at a pressure of 2 mm. until all the starting material is thermally decomposed. The contents of the receiver are then fractionated through a 12 inch column packed with glass helices. 82.5 parts (80%) of monomeric 1,1-dicyano ethylene ($N_D^{20}$ 1.442, M. P. 8° C., B. P. 47° C./2 mm.) are obtained. 70 parts of malononitrile are also obtained.

Example II 90 parts (.65 mole) of 1,1,3,3-tetracyano propane are pyrolyzed as in Example I, utilizing a temperature of 150° C. 44.7 parts (93%) of substantially pure monomeric 1,1-dicyano ethylene (M. P. 8° C.) are obtained.

Example III 60 parts of 1,1,3,3-tetracyano propane are pyrolyzed at a pressure of 2 mm. and a temperature of 180° C. through a plug of phosphorus pentoxide into a receiver maintained at a temperature of —70° C. until all the material is pyrolyzed. The mixture in the receiver is then fractionated into a flask containing phosphorus pentoxide whereupon 20 parts of monomeric 1,1-dicyano ethylene (M. P. 8° C.) are obtained.

Example IV 12 parts of 1,1,3,3-tetracyano propane are heated at a temperature of 180° C. and a pressure of 2 mm. in a distillation flask and the vapors conducted into a receiver maintained at —70° C. 1.9 parts of monomeric 1,1-dicyano ethylene and 7.7 parts of polymeric 1,1-dicyano ethylene are obtained. 1 part of malononitrile is also obtained. The polymer thus obtained is converted to substantially pure monomer by depolymerization at temperatures of 170° C. to 250° C.

Example V 10 parts of 1,1,3,3-tetracyano propane are heated at a temperature of 200° C. and a pressure of 50 mm. in a distillation flask connected to a receiver containing para-isopropyl toluene (para-cymene). The vapors formed are introduced into the receiver below the surface of the para-isopropyl toluene. The monomeric 1,1-dicyano ethylene and the malononitrile formed are soluble in the para-isopropyl toluene while the small amount of 1,1,3,3-tetracyano propane which is formed by the reversibility of the thermal decomposition reaction is insoluble and is removed by filtering. The filtrate is fractionated and 2 parts of monomeric 1,1-dicyano ethylene (M. P. 7°-8° C.) are obtained.

Example VI 10 parts of 1,1,3,3-tetracyano propane are heated to a temperature of 170° C. and at a pressure of 2 mm. in a distillation flask connected to a receiver. A current of sulfur dioxide is continuously passed through the entire apparatus to inhibit the polymerization of the 1,1-dicyano ethylene. The contents of the receiver are fractionated in a 12 inch column packed with glass helices and 4 parts of substantially pure monomeric 1,1-dicyano ethylene (M. P. 6°-8° C.) are obtained. 3½ parts of malononitrile are also obtained.

Example VII 10 parts of 1,1,3,3-tetracyano propane maintained in a pyrolysis flask are heated to a temperature of 200° C. at 1 mm. pressure and the resulting vapors condensed in a receiver cooled to 0° C. Polymeric 1,1-dicyano ethylene is recovered from the mixture in the receiver by adding ethyl alcohol to the mixture and filtering off the insoluble polymer. The polymer thus obtained gives the following analysis:

| Calculated | Found |
|---|---|
| C, 61.55% | C, 60.03% |
| H, 2.58% | H, 2.99% |
| N, 35.90% | N, 36.58% |

When the above examples are repeated utilizing atmospheric pressures and/or temperatures in excess of 250° C., 1,1-dicyano ethylene is again obtained in good yield although the yields are not as high as those obtained when the preferred conditions are utilized.

1,1-dicyano ethylene prepared by the method of this invention is very valuable for the preparation of polymers and copolymers suitable as synthetic rubbers, synthetic resins and plastics. Furthermore, the polymers of 1,1-dicyano ethylene are extremely useful in the preparation of spinning solutions from which can be spun fibers and filaments possessing many valuable properties including great tensile strength and resistance to abrasion and chemical action.

This application is a continuation-in-part of and a replacement for my application, Serial No. 775,149, filed September 19, 1947, now abandoned.

Numerous variations and modifications in the above procedure will be apparent to those skilled in the art and are included within the scope of the invention as defined in the appended claims.

I claim:

1. The method which comprises heating 1,1,3,3-tetracyano propane at a temperature and pressure such that vapors are evolved, condensing the effluent vapors, and separating 1,1-dicyano ethylene from the resulting condensate.

2. The method which comprises heating 1,1,3,3-tetracyano propane at a temperature in excess of 150° C. whereupon vapors are evolved, condensing the effluent vapors, and separating 1,1-dicyano ethylene from the resulting condensate.

3. The method which comprises heating 1,1,3,3-tetracyano propane at a temperature of 150° to 250° C. whereupon vapors are evolved, condensing the effluent vapors, and separating 1,1-dicyano ethylene from the resulting condensate.

4. The method which comprises heating 1,1,3,3-tetracyano propane at a temperature in excess of 150° C. and at a reduced pressure whereupon vapors are evolved, condensing the effluent vapors, and separating 1,1-dicyano ethylene from the resulting condensate.

5. The method which comprises heating 1,1,3,3-tetracyano propane at a temperature in excess of 150° C. and at a pressure below 100 mm. whereupon vapors are evolved, condensing the effluent vapors and separating 1,1-dicyano ethylene from the resulting condensate.

6. The method which comprises heating 1,1,3,3-tetracyano propane at a temperature in excess of 150° C. and in the presence of phosphorus pentoxide whereupon vapors are evolved, condensing the effluent vapors, and separating monomeric 1,1-dicyano ethylene from the resulting condensate.

7. The method which comprises heating 1,1,3,3-tetracyano propane at a temperature in excess of 150° C., at a reduced pressure, and in the presence of phosphorus pentoxide whereupon vapors are evolved, condensing the effluent vapors, and separating monomeric 1,1-dicyano ethylene from the resulting condensate.

8. The method which comprises heating 1,1,3,3-tetracyano propane at a temperature in excess of 150° C., at a pressure below 100 mm., and in the presence of phosphorus pentoxide whereupon vapors are evolved, condensing the effluent vapors, and separating monomeric 1,1-dicyano ethylene from the resulting condensate.

9. The method which comprises heating 1,1,3,3-tetracyano propane at a temperature in excess of 150° C., at a reduced pressure whereupon vapors are evolved, collecting said vapors in a receiver containing para-isopropyl toluene, and separating 1,1-dicyano ethylene from the resulting mixture.

10. The method which comprises heating 1,1,3,3-tetracyano propane at a temperature in excess of 150° C., at a reduced pressure, and in the presence of sulfur dioxide whereupon vapors are evolved, condensing the effluent vapors, and separating monomeric 1,1-dicyano ethylene from the resulting condensate.

11. The method which comprises heating 1,1,3,3-tetracyano propane at a temperature and pressure such that decomposition occurs to form vapors of 1,1-dicyano ethylene and malononitrile and separating the 1,1-dicyano ethylene from the malononitrile.

HARRY GILBERT.

REFERENCES CITED

The following references are of record in the file of this patent:

UNITED STATES PATENTS

| Number | Name | Date |
| --- | --- | --- |
| 2,467,378 | Gilbert | Apr. 19, 1949 |
| 2,476,270 | Ardis | July 19, 1949 |

OTHER REFERENCES

Ostling: Chem. Abstracts, vol. 15, p. 2829 (1921).

Diels et al.: Ber. Deut. Chem., vol. 55, pp. 3445–3446 (1922).

Conn et al,: Ber. Deut. Chem., vol. 56, 2076–2080 (1923).